(12) United States Patent
Feist

(10) Patent No.: US 6,886,435 B2
(45) Date of Patent: May 3, 2005

(54) TURNING AND QUALITY ASSURANCE PROCESS FOR THERMALLY SPRAYED TURBOMACHINE LININGS

(75) Inventor: Wolf-Dieter Feist, Munich (DE)

(73) Assignee: MTU Aero Engines GmbH, Munich (DE)

(*) Notice: Subject to any disclaimer, the term of this patent is extended or adjusted under 35 U.S.C. 154(b) by 18 days.

(21) Appl. No.: 10/363,986
(22) PCT Filed: Sep. 5, 2001
(86) PCT No.: PCT/DE01/03384
§ 371 (c)(1), (2), (4) Date: Sep. 26, 2003
(87) PCT Pub. No.: WO02/20212
PCT Pub. Date: Mar. 14, 2002

(65) Prior Publication Data
US 2004/0067116 A1 Apr. 8, 2004

(30) Foreign Application Priority Data
Sep. 8, 2000 (DE) .......................... 100 44 592

(51) Int. Cl.$^7$ ................................. B23B 3/00
(52) U.S. Cl. ..................... 82/1.11; 82/47; 82/118; 700/173
(58) Field of Search ............ 82/1.11, 47, 118; 700/173

(56) References Cited

U.S. PATENT DOCUMENTS

| | | | |
|---|---|---|---|
| 4,031,368 A | * | 6/1977 | Colding et al. ............. 700/173 |
| 4,501,095 A | | 2/1985 | Drinkuth et al. |
| 5,115,403 A | | 5/1992 | Yoneda et al. |
| 5,506,786 A | | 4/1996 | Itoh et al. |
| 5,631,852 A | | 5/1997 | Chen |
| 6,089,825 A | * | 7/2000 | Walden et al. ........... 415/173.4 |
| 6,177,174 B1 | * | 1/2001 | Legrand ..................... 428/141 |

FOREIGN PATENT DOCUMENTS

| | | |
|---|---|---|
| DE | 42 28 333 | 3/1993 |
| DE | 197 30 008 | 10/1998 |
| WO | WO 96/05331 | 2/1996 |

* cited by examiner

Primary Examiner—Willmon Fridie, Jr.
(74) Attorney, Agent, or Firm—Crowell & Moring LLP

(57) ABSTRACT

A rotational machining and quality assurance method for thermally extruded linings of turbomachinery are provided. First, a harder top coating is removed by turning, then the lining is finish-turned to size. During the finish-turning, defined turning parameters are maintained and a cutting force characteristic is quantitatively detected and stored. The force characteristic is compared with predetermined limit values, and, depending on the result of the comparison, the lining is approved for use or is produced again.

20 Claims, 1 Drawing Sheet

TURNING AND QUALITY ASSURANCE PROCESS FOR THERMALLY SPRAYED TURBOMACHINE LININGS

BACKGROUND AND SUMMARY OF THE INVENTION

The invention relates to a turning and quality assurance process for thermally sprayed, rotationally symmetrical grazing and running-in linings of turbomachines.

Thermally sprayed linings are used in turbomachines, in particular in gas turbines, as porous grazing or running-in linings. On the one hand, they are not to be too soft (porous) in order to resist the high loads caused by alternating gas forces and vibrations; on the other hand, they must be soft enough in order not to damage the grazing or running-in partner, e.g. a blade tip or a sealing lip (sealing fin). The hardness of the linings is set by varying the spraying parameters. However, they can only be measured in a very inadequate manner by a special ball impression method. The results have considerable spread and are no reliable measure of the quality of the coating. In addition, they depend on the geometry.

In many cases, the hardness is also measured on reference specimens which have been sprayed with the same parameter setting. Transferring the values thus determined to the component is likewise problematical.

After the spraying, the linings have excess material, which is removed again during the finish machining. The top coating, that is to say the coating finally applied during the spraying, generally has a different, harder consistency than the rest of the lining material. This is also to be taken into account during testing.

The substantial disadvantages of the known processes therefore consist in the fact that measurements can often only be taken on specimens and not on the component itself and also in the fact that the quality test as such—even on the component—delivers relatively unreliable results.

DE 197 30 008 C1 (corresponding U.S. Pat. No. 6,177,174) protects armor plating for a metallic engine component and a process of producing it. Such components are in particular sealing tips of labyrinth seals or blade tips which interact with corresponding grazing or running-in linings. An embodiment of this patent provides for the component to be finish-machined by turning after the coating with a ceramic material, preferably by means of thermal spraying.

DE 42 28 333 A1 (corresponding U.S. Pat. No. 5,506,786) relates to a metal-cutting apparatus for finish machining a surface of a workpiece of a metallic material, having a detection device for the cutting force exerted on the metal-cutting apparatus by the workpiece. The apparatus is preferably used for the superfine finish turning of photoreceptor cells, the requirements for the surface quality being extremely high. Typical features of such an apparatus are a monocrystalline diamond tool, a feed device for a liquid cutting lubricant and a disposal device for chips. Before the actual series production, test series with varying machining parameters are run and the cutting force characteristic is measured and stored in each case. Typical cutting force characteristics are obtained in the event of machining errors, such as vibrations, scratches, chip accumulation, unmachined material, etc. In series production, the cutting force characteristic for each component is measured, stored and compared with the characteristic from the test series. If there is a large degree of correspondence with a typical "error characteristic" (e.g. vibrations), this is an indication that the respective component is likewise defective. If need be, the machining parameters then have to be changed. The metal-cutting apparatus described and the associated processes are thus only suitable for the precision machining of surfaces.

Against this background, the object of the invention is to specify a turning and quality assurance process for thermally sprayed, rotationally symmetrical grazing and running-in linings of turbomachines which detects the lining quality on the component itself, which advantageously combines the quality test with the machining and which delivers reliable, reproducible measured values for the entire effective lining region.

This object is achieved by removing a top coating, which is harder in relation to a nominal lining consistency, finish-turning to size the lining still having excess material, maintaining turning parameters defined during the finish-turning, detecting the cutting force or a force proportional thereto quantitatively in a characteristic, recording graphically or storing in a data system said characteristic, comparing the force characteristic with predetermined limit values, and, depending on a result of the comparing, approving the lining for use or removing again and producing again with altered spraying parameters.

The turning itself is carried out in two steps, the first serving for the material removal of the relatively hard top layer, the second serving for the actual machining to size. During the second step (finish turning), defined turning parameters (cutting speed, feed, recessing depth, etc.) are maintained and the cutting force characteristic is quantitatively detected and is recorded graphically or in a data system. The force characteristic is compared with predetermined limit values, in which case, as a result, the lining is approved for use or is removed and produced again. For the definition of the decisive limit values, it will be necessary to produce actual linings while varying the spraying parameters, to detect the cutting force characteristic during the turning and to store it, and to test the grazing or running-in behavior of the lining variants. In the process, good to useful and less useful to useless variants will be obtained, the cutting force characteristics of which lead to the desired limit values.

Preferred developments of the process according to the main claim are characterized in the subclaims.

The invention is explained in more detail below with reference to the figures.

DETAILED DESCRIPTION OF THE DRAWINGS

Figure 1:
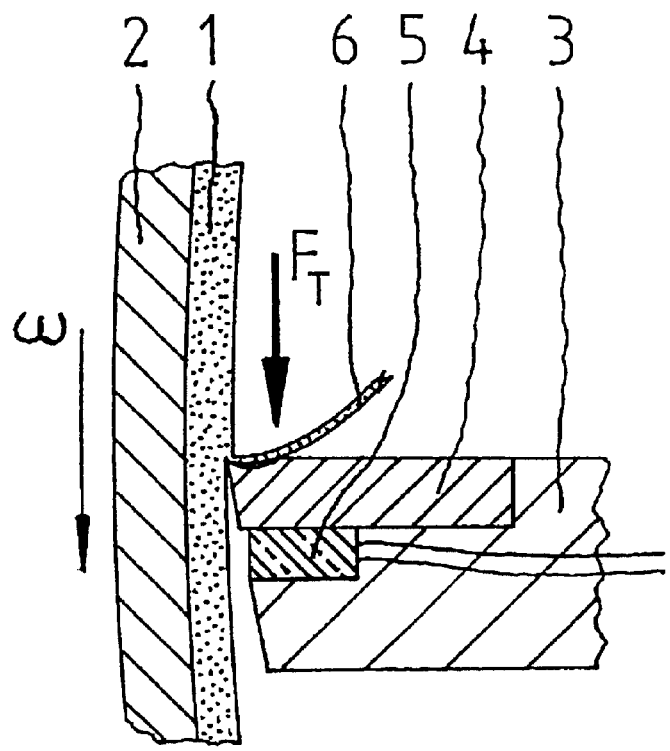
FIG. 1 shows a partial section through a component with a lining and through a turning tool during the turning.

The lining 1 according to FIG. 1 is sprayed onto the circular-cylindrical inside of a component 2, the latter being, for example, an element from an aircraft gas turbine or a stationary gas turbine. A moment during the method step "finish turning to size" is reproduced. On the right can be seen the cutting end of a turning tool 3 having a separate cutting tip 4, and a chip 6 running off up to the right. The component 2 together with lining 1 rotates at a predetermined angular velocity $\omega$, which is kept as constant as possible. A piezoelectric transducer 5 for the sensory detection of a tangential force $F_T$, proportional to the cutting force, on the cutting tip 4 is arranged under that end of the cutting tip 4 which faces the lining. According to the invention, turning parameters predetermined during the finish turning are kept constant, namely the geometry of the cutting tip, the cutting speed proportional to ω, the axial tool feed, the radial recessing depth/infeed of the tool and thus the chip cross section. This is necessary in order to obtain a reproducible $F_T$ characteristic. The force may also be measured at another point or in a different way.

Figure 2:
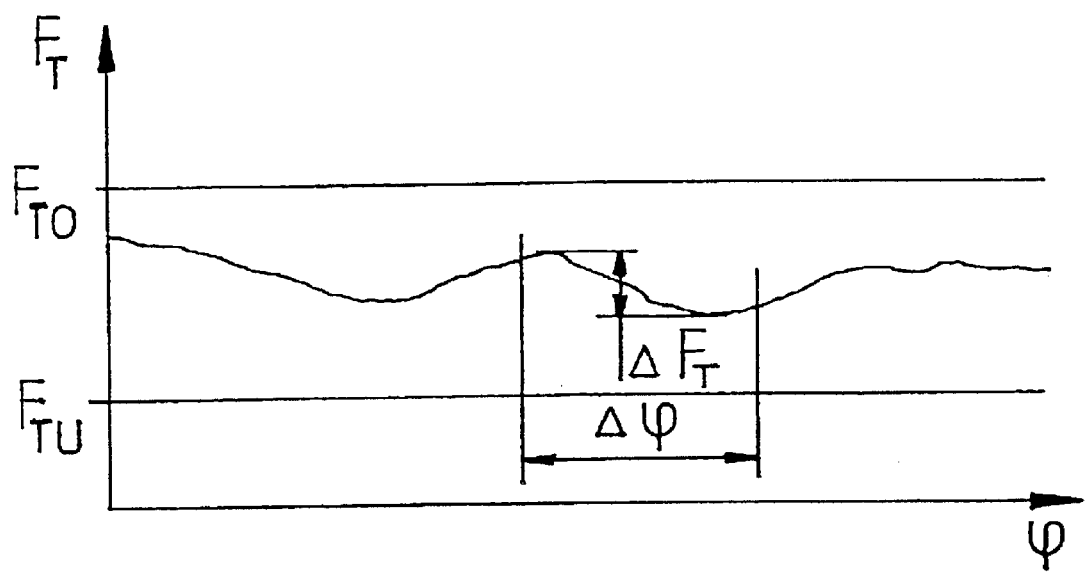
FIG. 2 shows a diagram with a characteristic of the tangential force plotted against the rotation angle, and with additional limit value specifications.

FIG. 2 shows, in the form of a diagram, such an $F_T$ characteristic as a continuous, irregular, predominantly horizontal line. The rotation angle φ is specified as horizontal coordinate (abscissa). Alternatively, a turning length (e.g. in meters), proportional to φ, or the time could also be used here. The tangential force $F_T$ is specified as vertical coordinate (ordinate). Furthermore, an upper force limit value $F_{TO}$ and a lower force limit value $F_{TU}$ are plotted as horizontal straight lines.

As a criterion or as the only criterion for the quality of the lining 1, it may be stipulated that the entire $F_T$ characteristic during the finish turning must not fall below the limit $F_{TU}$ or exceed the limit $F_{TO}$. This is the case in the present representation, so that the lining could be approved for use.

As an additional criterion to the above, it could be stipulated that the change $\Delta F_T$ in tangential force must not exceed a maximum limit value over a defined change Δφ in the rotation angle, neither during a decreasing nor an increasing force characteristic. This criterion is also to apply over the entire length (φ) of the $F_T$ characteristic, i.e. when Δφ is positioned in any desired manner in the diagram. The purpose of this criterion would be to limit local strength or hardness changes and thus inhomogeneity of the lining. If the limit value were to be exceeded, production would be necessary again here too.

Other criteria are certainly conceivable which do not change the inventive principle in any respect.

What is claimed is:

1. A turning and quality assurance process for thermally sprayed, rotationally symmetrical grazing and running-in linings of turbomachines, comprising:
   removing a top coating, which is harder in relation to a nominal lining consistency, by turning,
   finish-turning to size the lining still having excess material,
   predetermining turning parameters during the finish turning, said turning parameters including geometry of a cutting tool cutting tip, rotational cutting speed of the cutting tool, axial cutting tool feed and radial recessing depth/infeed of the cutting tool,
   maintaining a plurality of said predetermined parameters constant during the finish-turning,
   quantitatively detecting a characteristic proportional to a cutting force during the final turning,
   recording graphically or storing said characteristic in a data system,
   comparing the force characteristic with predetermined limit values, and
   depending on a result of the comparison, approving the lining for use, or removing again and producing again with altered spraying parameters.

2. The process according to claim 1, wherein the lining is approved for use if the entire force characteristic, during the finish-turning, lies between a predetermined lower force limit value and a predetermined upper force limit value.

3. The process according to claim 2, wherein the lining is approved for use only when, in addition to maintaining the upper and lower force limit values, the force characteristic, at each point, fulfills a condition that an absolute change in force does not exceed a maximum limit value of the change in force within a predetermined change in rotation angle.

4. The process according to claim 1, wherein the quantitatively detecting a cutting force includes detecting a tangential component of the cutting force or a force proportional thereto.

5. The process according to claim 2, wherein the quantitatively detecting a cutting force includes detecting a tangential component of the cutting force or a force proportional thereto.

6. The process according to claim 3, wherein the quantitatively detecting a cutting force includes detecting a tangential component of the cutting force or a force proportional thereto.

7. The process according to claim 1, wherein a measuring signal for detecting the cutting force or a force proportional thereto is produced piezoelectrically in a region of the turning tool.

8. The process according to claim 2, wherein a measuring signal for detecting the cutting force or a force proportional thereto is produced piezoelectrically in a region of the tuning tool.

9. The process according to claim 3, wherein a measuring signal for detecting the cutting force or a force proportional thereto is produced piezoelectrically in a region of the turning tool.

10. The process according to claim 4, wherein a measuring signal for detecting the cutting force or a force proportional thereto is produced piezoelectrically in a region of the turning tool.

11. A turbomachine component having a lining comprising the component made according to the process of claim 1.

12. A method of making a thermally sprayed lining of a turbomachine, comprising:
   removing a top coating of the lining by turning,
   finish-turning the lining to a predetermined size,
   predetermining turning parameters during the finish turning, said turning parameters including geometry of a cutting tool cutting tip, rotational cutting speed of the cutting tool, axial cutting tool feed and radial recessing depth/infeed of the cutting tool,
   maintaining a plurality of said predetermined parameters constant during the finish-turning,
   quantitatively detecting a characteristic of a cutting force or a force proportional thereto during the finish turning,
   recording graphically or storing said characteristic,
   comparing the characteristic with predetermined limit values, and
   approving the lining for use based on a result of the comparing of the characteristics with the limit values.

13. The process according to claim 1, wherein said maintaining a plurality of said predetermined turning parameters constant during the finish-turning includes maintaining all of said predetermined turning parameters constant during the finish-turning.

14. The process according to claim 13, wherein the lining is approved for use if the entire force characteristic, during the finish-turning, lies between a predetermined lower force limit value and a predetermined upper force limit value.

15. The process according to claim 14, wherein the lining is approved for use only when, in addition to maintaining the upper and lower force limit values, the force characteristic, at each point, fulfills a condition that an absolute change in force does not exceed a maximum limit value of the change in force within a predetermined change in rotation angle.

16. The process according to claim 13, herein the quantitatively detecting a cutting force includes detecting a tangential component of the cutting force or a force proportional thereto.

17. The process according to claim 13, wherein a measuring signal for detecting the cutting force or a force proportional thereto is produced piezoelectrically in a region of the turning tool.

18. The method according to claim 12, wherein said maintaining a plurality of said predetermined turning parameters constant during the finish-turning includes maintaining all of said predetermined turning parameters constant during the finish-turning.

19. The method according to claim 18, wherein the lining is approved for use if the entire force characteristic, during the finish-turning, lies between a predetermined lower force limit value and a predetermined upper force limit value.

20. The method according to claim 19, wherein the lining is approved for use only when, in addition to maintaining the upper and lower force limit values, the force characteristic, at each point, fulfills a condition that an absolute change in force does not exceed a maximum limit value of the change in force within a predetermined change in rotation angle.

* * * * *